United States Patent [19]

Abraham et al.

[11] Patent Number: 5,358,803

[45] Date of Patent: Oct. 25, 1994

[54] CATALYZED CATHODES FOR ELECTROCHEMICAL CELLS

[75] Inventors: Kuzhikalail M. Abraham, Needham; Mohamed Alamgir, Dedham, both of Mass.

[73] Assignee: EIC Laboratories, Inc., Norwood, Mass.

[21] Appl. No.: 879,654

[22] Filed: May 6, 1992

[51] Int. Cl.⁵ .............................. H01M 10/36
[52] U.S. Cl. ............................ 429/101; 429/43; 429/196
[58] Field of Search ............ 429/101, 194, 196, 197, 429/40, 43; 502/150

[56] References Cited

U.S. PATENT DOCUMENTS 4,613,551  9/1986  Doddapaneni ............... 429/196
4,698,283  10/1987  Doddapaneni ............... 429/101
4,710,437  12/1987  Doddapaneni ............... 429/101

OTHER PUBLICATIONS

K. A. Klinedinst, J. Electrochem. Soc., 131, 492 Mar. (1984).

*Primary Examiner*—Anthony Skapars

[57] ABSTRACT

Catalysts to enhance the discharge rates of Li cells containing sulfur oxyhalide depolarizers are disclosed. A preferred catalyst consists of a mixture of cobalt acetate and polyacrylonitrile.

4 Claims, 3 Drawing Sheets

CATALYZED CATHODES FOR ELECTROCHEMICAL CELLS

This invention was made with Government support under Contract N60921-90-C-0155 awarded by the Navy. The Government has certain rights in this invention.

FIELD OF THE INVENTION

This invention pertains to catalyzed cathodes to enhance the discharge rates of Li cells containing sulfur oxyhalide depolarizers. In particular, this invention relates to catalyzed cathodes, comprising carbon black impregnated with polyacrylonitrile (PAN) and cobalt acetate (CoAc), for use in Li-sulfuryl chloride (Li/$SO_2Cl_2$) and Li-thionyl chloride (Li/$SOCl_2$) electrochemical cells.

BACKGROUND OF THE INVENTION

Lithium cells utilizing sulfuryl chloride or thionyl chloride as the cathode depolarizer are characterized by very high open circuit voltages (OCV). The OCV of the Li/$SO_2Cl_2$ cell is 3.90 volt, while that of the Li/$SOCl_2$ cell is 3.65 volt. These cells consist of an electrode package of a Li foil anode and a porous carbon black cathode, the two being electrically insulated by a fiberglas separator. The $SO_2Cl_2$ or $SOCl_2$ liquid cathode depolarizer, having rendered ionically conductive by dissolving $LiAlCl_4$ in it, is added to the electrode package contained in a suitable container such as a glass vial or a metal can. The load voltages of the cells are usually high, being only slightly below the open circuit voltage, when discharged at low current densities such as 0.5 to 1 mA/$cm^2$. For example, a Li/$SO_2Cl_2$ D-cell discharged at 0.88 mA/$cm^2$ has a mid-discharge voltage of about 3.4 V while a Li/$SOCl_2$ C-cell discharged at 1 mA/$cm^2$ has a mid-discharge voltage of 3.3 V. However, the load voltages of these cells decrease significantly when discharged at high current densities; for example, 25 mA/$cm^2$. At these currents, the load voltages of the cells with uncatalyzed cathodes are only about 2.5 V. That is to say, the rate capability of the Li/$SOCl_2$ and the Li/$SO_2Cl_2$ cell is poor. It is desirable to maintain the load voltages of these cells close to their open circuit voltages even at current densities as high as 25 mA/$cm^2$. It is recognized that the poor rate capability is related to the low activity of the porous carbon cathode.

Some improvement in the rate capability of the carbon cathode has been achieved by adding to the carbon black metals such as platinum (K. Klinedinst, J. Electrochem. Soc., 131, 492 (1984)) or transition metal macrocyclic complexes such as iron phthalocyanine and iron tetraphenyl porphyrin (N. Doddapaneni, U.S. Pat. No.4,613,551). Platinum is very expensive and its addition makes the cell very costly. The metal macrocyclic complexes are not readily available. They are unusual materials and are prepared by tedious procedures. The need exists for catalysts which can be prepared from readily available reagents and are effective in increasing the rate capability of Li/$SO_2Cl_2$ and Li/$SOCl_2$ electrochemical cells.

Accordingly, an object of this invention is to provide catalyzed cathodes, for sulfur oxyhalide cells, which can be readily prepared from common reagents and are effective in significantly increasing the rate capability of the cells.

SUMMARY OF THE INVENTION

The invention features catalyzed cathodes for Li/$SO_2Cl_2$ and Li/$SOCl_2$ cells. Traditionally, the cathode for these cells is made from a high surface carbon such as Chevron TM acetylene black. Such cathodes have poor rate capability, manifested as low load voltages at high discharge current densities of 10-25 mA/$cm^2$. It is a feature of this invention that the rate capability of carbon black-based cathodes is substantially increased by the addition of a mixture of cobalt acetate, Co-$(OOCCH_3)_2$, and polyacrylonitrile, —(—$CH_2CH$-CN—)$_n$—, to the carbon black, followed by heat treatment at a high temperature. It is another object of the invention that the highest catalytic activity is obtained for particular ratios of carbon black, cobaltous acetate and polyacrylonitrile. Thus a feature of this invention is that the best catalytic activity is realized for electrodes containing 75–88 weight-percent (w/o) acetylene black carbon: 10–20 w/o polyacrylonitrile and 2–5 w/o cobalt acetate. We have observed increases in discharge load voltage amounting to 400–500 mV in Li/$SO_2Cl_2$ cells containing cathodes having the compositions of: i) 75 w/o Chevron acetylene carbon black, 19 w/o PAN and 6 w/o cobalt acetate and ii) 85 w/o Chevron acetylene black, 9 w/o PAN and 6 w/o cobalt acetate. These electrodes were prepared by first mixing appropriate amounts of Chevron acetylene black with polyacrylonitrile and cobalt acetate in warm dimethyl formamide (DMF) solvent, removing the DMF by evaporation and heat-treating the resulting mixture at 800° C. for 2 hours in a nitrogen atmosphere. The positive electrodes (cathodes) for fabricating sulfur oxyhalide cells were made by pasting the catalyzed carbon mix on an expanded nickel current collector. The electrodes had a thickness of about 0.02 cm.

While the preferred embodiment of the catalyst is composed of cobalt acetate and PAN, it is possible that other cobalt salts, as well as other transition metal salts including acetates, when used in conjunction with PAN will show catalytic activity for the reduction of $SO_2Cl_2$ or $SOCl_2$ on carbon black.

The activity of the catalysts of the present invention is expressed as their ability to lower the overpotential for the reduction of $SO_2Cl_2$ or $SOCl_2$ on porous carbon electrodes. Accordingly, the catalysts should be active for increasing the rate capability of sulfur oxyhalide cells irrespective of the nature of the negative electrode (anode). Therefore, the catalyzed cathodes of the present invention should be useful for the high rate reduction of $SO_2Cl_2$ or $SOCl_2$ in cells employing negative electrodes of alkali metals such as Li, Na, K, Rb and Cs, and of alkaline earth metals such as Be, Mg, Ca and Sr.

DESCRIPTION OF THE INVENTION

EXAMPLE 1

Preparation of Catalyzed Cathode

Figure 1:
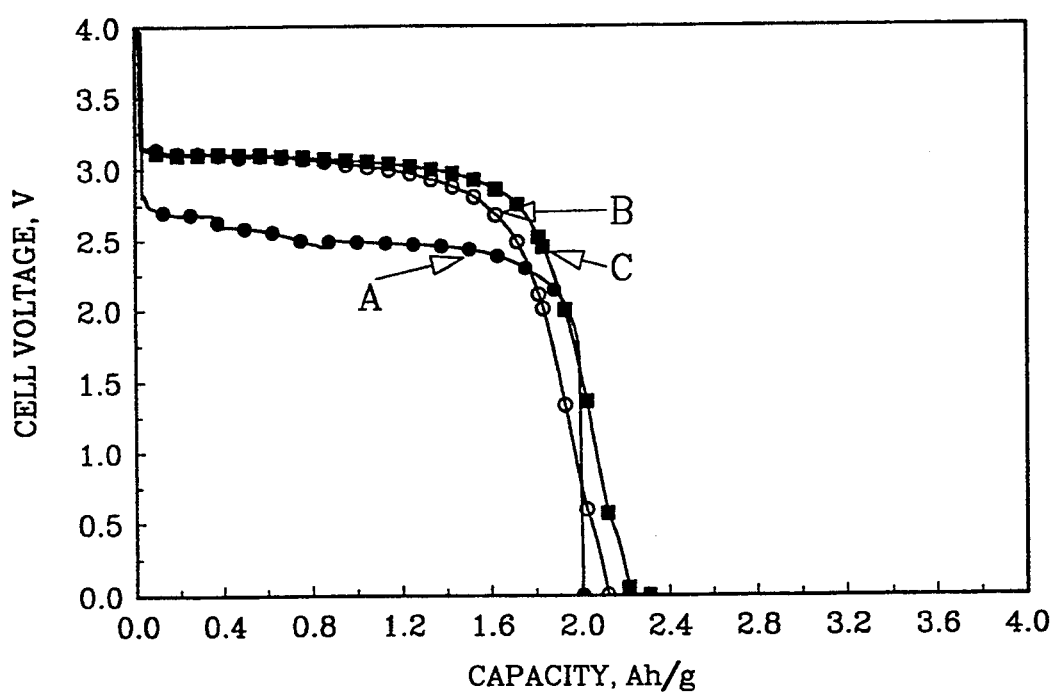
FIG. 1 is a graphical comparison of the discharge of Li/$SO_2Cl_2$ cells with carbon electrodes containing a catalyst of the present invention and of a Li/$SO_2Cl_2$ cell without the catalyst, at 25 mA/$cm^2$ black:19 w/o PAN: 6 w/o cobalt acetate.

A typical preparation of the catalyst was carried out using the amounts of carbon, polyacrylonitrile and cobalt acetate shown in Table 1.

TABLE 1

AMOUNTS OF MATERIALS FOR THE PREPARATION OF CATALYZED CATHODES

|  | Amount (gram) | Weight-Percent |
|---|---|---|
| Chevron Acetylene Black Carbon | 3.12 | 75 |
| Polyacrylonitrile (PAN) | 0.8 | 19 |
| Cobalt Acetate (CoAc) | 0.24 | 6 |

The polyacrylonitrile and cobalt acetate were dissolved in 50 ml of dimethylformamide (DMF) at 120° C. Chevron acetylene black was added to this solution and mixed thoroughly. The DMF was removed by evaporation. The mixture remaining was heated at 800° C. for two hours in a nitrogen atmosphere. This catalyst will be designated, hereafter, as the 800° C.-catalyst.

In another preparation, the catalyst prepared as above was heated out 600° C. for two hours in a nitrogen atmosphere. This catalyst will be called the 600° C.-catalyst.

In another preparation, the 800° C.-catalyst was prepared using Chevron acetylene black, polyacrylonitrile and cobalt acetate taken in the proportion shown in Table 2.

TABLE 2

AMOUNTS OF MATERIALS FOR THE PREPARATION OF CATALYZED CATHODES

|  | Amount (gram) | Weight-Percent |
|---|---|---|
| Chevron Acetylene Black Carbon | 3.52 | 85 |
| Polyacrylonitrile | 0.4 | 9 |
| Cobalt Acetate | 0.24 | 6 |

EXAMPLE 2

Preparation of Carbon Cathode containing Polyacrylonitrile

A mixture consisting of 3.90 g of Chevron acetylene black and 0.4 g of polyacrylonitrile was mixed in warm DMF as in Example 1. After removing the DMF by evaporation, the mixture was heated at 800° C. for two hours in a nitrogen atmosphere.

EXAMPLE 3

Preparation of Carbon Cathode containing Cobalt Acetate

A mixture consisting of 3.90 g of Chevron acetylene black and 0.24 g of cobalt acetate [CO(OOCCH$_3$)$_2$] was mixed in warm DMF as in Example 1. After removing the DMF by evaporation, the mixture was heated at 800° C. for two hours in a nitrogen atmosphere.

EXAMPLE 4

Preparation of Carbon Cathode without Cobalt Acetate and Polyacrylonitrile 4.0g of Chevron acetylene black was heated at 800° C. for two hours in a nitrogen atmosphere.

EXAMPLE 5

Preparation of Lithium Cells

Electrochemical cells were fabricated with Li foil anodes and cathodes made from the carbon preparations of Examples 1–4.

The cathodes were made by mixing the carbon preparation of Example 1, 2, 3 or 4 with about 10 weight percent of Dupont TFE30 Teflon TM dispersion, pasting the mixture on an expanded nickel screen and bonding the cathode to the screen by sintering at 300° C. for half an hour in an Argon atmosphere. The electrodes were about 0.02 cm thick.

The cells were fabricated by sandwiching a cathode having the dimensions of 3.5 cm×3 cm×0.02 cm between Li foil anodes (3.5 cm×3 cm×0.05 cm), the cathode and anode being electrically insulated by 0.013 cm thick fiberglas mat separator. This electrode package was placed in a prismatic glass vial, the top of which was sealed by a Viton gasket and a polypropylene disc having feedthroughs for electrical connections. The cell was completed by adding 3 ml of either a SO$_2$Cl$_2$ or a SOCl$_2$ electrolyte/depolarizer to it. The SO$_2$Cl$_2$ electrolyte consisted of a solution of 1.5 molar (M) LiAlCl$_4$ in SO$_2$Cl$_2$. The SO Cl$_2$ electrolyte consisted of a solution of 1.5M LiAlCl$_4$ in SOCl$_2$.

EXAMPLE 6

Li/SO$_2$Cl$_2$ cells were prepared with the uncatalyzed cathodes of Example 4. The cells were discharged at 25 mA/cm$^2$ at room temperature. Typically, these cells exhibited a capacity of 550 mAh, equivalent to a carbon utilization of 2 Ah/g. The mid-discharge voltage was 2.5 V. A typical discharge of this type of a cell is presented in FIG. 1, curve A.

EXAMPLE 7

Li/SO$_2$Cl$_2$ cells were fabricated with the 800° C.-catalyzed electrodes having the composition given in Table 1. The cells were discharged at 25 mAh/cm$^2$ at room temperature. The cells exhibited a capacity of 2.1 Ah/g of carbon and a mid-discharge voltage of 3 V (curves B and C in FIG. 1 ). The catalyzed cells discharged at 0.5 V higher than the uncatalyzed cell. This corresponds to a 20 percent increase in the power output for the catalyzed cells.

EXAMPLE 8

Catalyzed Li/SO$_2$Cl$_2$ cells similar to those described in Example 7 were discharged at 10 mA/cm$^2$ at room temperature. The cells had a mid-discharge voltage of 3.5 V and a capacity of about 2.4 Ah/g of carbon (curves B and C in FIG. 2).

Figure 2:
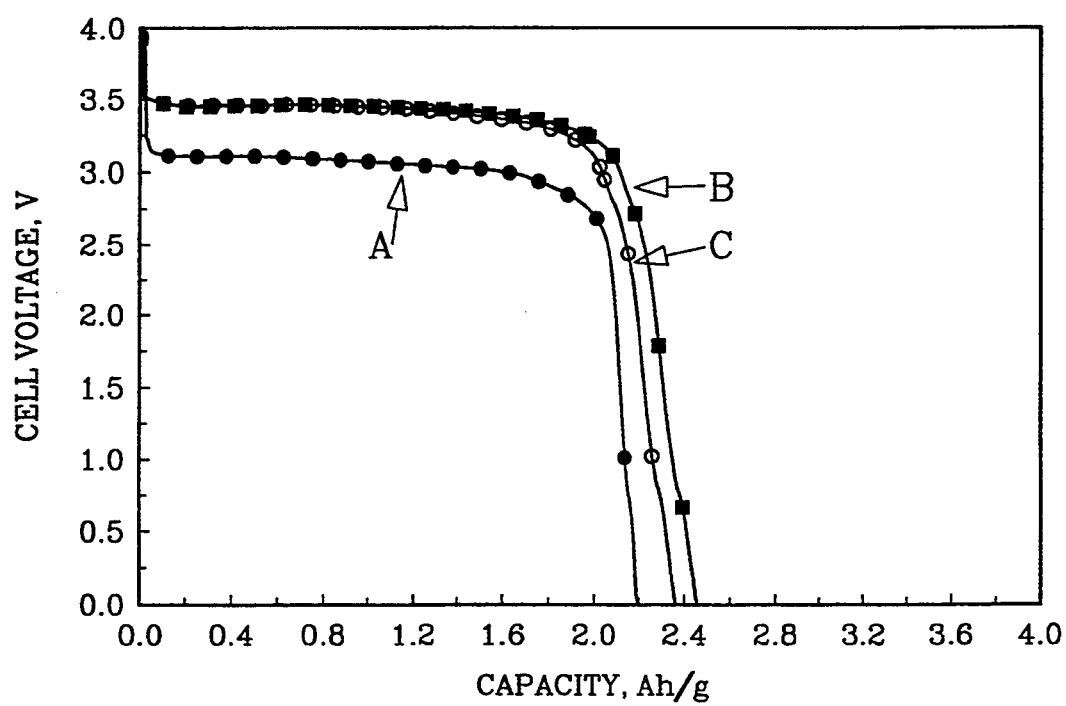
FIG. 2 is a graphical comparison of the discharge of Li/$SO_2Cl_2$ cells with carbon electrodes containing a catalyst of the present invention and of a Li/$SO_2Cl2$ cell without a catalyst in the cathode, at 10 mA/$cm^2$ at room temperature. The catalyst is the same as in FIG. 1.

Li/SO$_2$Cl$_2$ cells of the type described in Example 6 with uncatalyzed cathodes were also discharged at 10 mA/cm$^2$ (curve A in FIG. 2). They had a mid-discharge voltage of 3.1 V which is 0.4 V lower than that of the catalyzed cells.

Thus, the catalyzed cells had a 12.9% higher power output than the uncatalyzed cells.

EXAMPLE 9

Li/$SO_2Cl_2$ cells were fabricated with the 800° C -catalyzed electrodes having the composition given in Table 2. The cells were discharged at 25 mA/$cm^2$ at room temperature. They exhibited a capacity of 2 Ah/g of carbon and a mid-discharge voltage of 3.0 V. The catalyzed cells discharged at 0.5 V higher than the uncatalyzed cell. This corresponds to a 20 percent increase in the power output of catalyzed cells.

EXAMPLE 10

Figure 3:
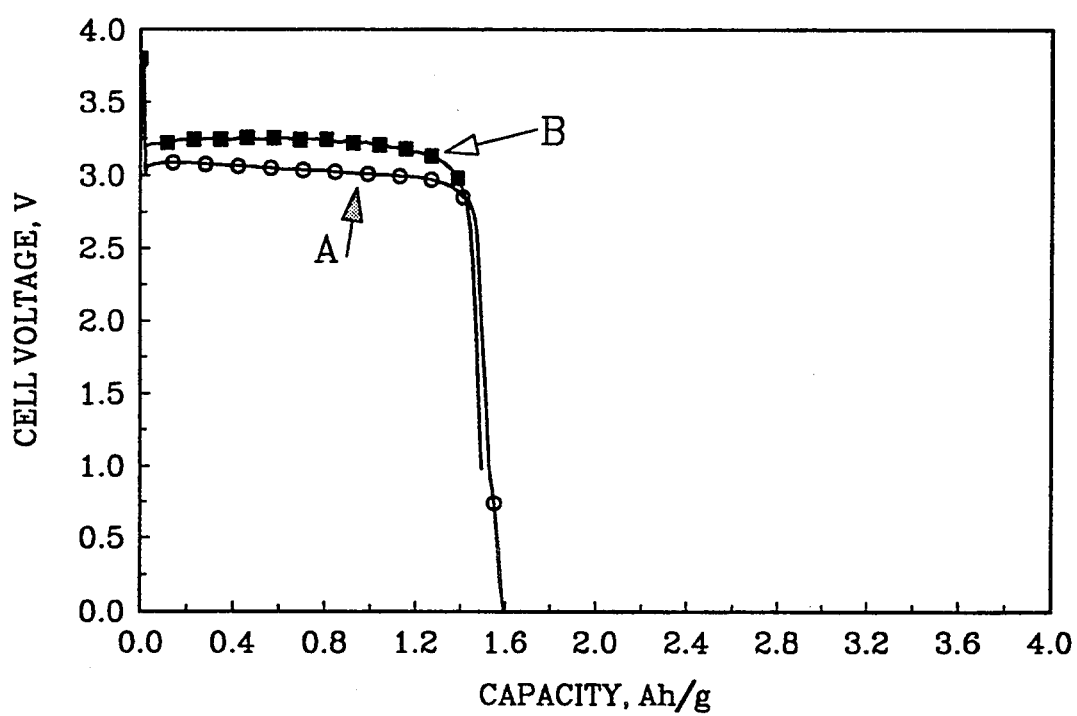
FIG. 3 is a graphical comparison of the discharge of a Li/$SOCl_2$ cell with carbon electrodes containing a catalyst of the present invention and of a Li/$SOCl_2$ cell without the catalyst in the cathode at 25 mA/cm$^2$. The catalyzed cathode is 85 w/o Chevron acetylene black, 9 w/o PAN and 6 w/o cobalt acetate.

Li/$SOCl_2$ cells were fabricated with the 800° C.-catalyzed electrodes having the composition given in Table 2. The cells were discharged at 25 mA/$cm^2$ at room temperature. They exhibited a capacity of 1.6 Ah/g of carbon and a mid-discharge voltage of 3.25 V (FIG. 3, B). The catalyzed cells exhibited 0.25 V higher load voltage than uncatalyzed Li/$SOCl_2$ cells (FIG. 3, A). This corresponds to 11% higher power output for catalyzed cells.

EXAMPLE 11

Li/$SO_2Cl_2$ cells were fabricated with carbon cathodes prepared in the manner as described in Example 2. The cells were discharged at 25 mA/$cm^2$ at room temperature. They exhibited a capacity of 2.2 Ah/g of carbon and a mid-discharge voltage of 2.2 V. These data are inferior to those obtained with the uncatalyzed cells. It shows that polyacrylonitrile alone imparts no catalytic activity to the carbon cathode.

EXAMPLE 12

Li/$SO_2Cl_2$ cells were fabricated with carbon cathodes prepared in the manner as described in Example 3 The cells were discharged at 25 mA/$cm^2$ at room temperature. They exhibited a capacity of 1.7 Ah/g of carbon and a mid-discharge voltage of 2.9 V. This performance is the same as those shown by uncatalyzed cells. It shows that cobalt acetate alone imparts no catalytic activity to the carbon cathode.

We claim:

1. In a nonaqueous electrochemical cell having an active metal anode, a high surface area carbon cathode and a nonaqueous electrolyte in a sulfur oxyhalide depolarizer solvent, the improvement comprising:
   a catalyst for the reduction of said oxyhalide depolarizer consisting of a mixture of polyacrylonitrile and cobalt acetate.

2. The cell of claim 1 wherein said oxyhalide is sulfuryl chloride.

3. The cell of claim 1 wherein said oxyhalide is thionyl chloride.

4. The cell of claim 2 wherein said active metal is Li, Na, K, Mg, or Ca.

* * * * *